US011913202B2

(12) United States Patent
Slaughter

(10) Patent No.: US 11,913,202 B2
(45) Date of Patent: Feb. 27, 2024

(54) THERAPEUTIC SUBSTANCE DISPENSING SHOWER HEAD SYSTEM

(71) Applicant: James Slaughter, Seminole, FL (US)

(72) Inventor: James Slaughter, Seminole, FL (US)

( * ) Notice: Subject to any disclaimer, the term of this patent is extended or adjusted under 35 U.S.C. 154(b) by 132 days.

(21) Appl. No.: 17/343,801

(22) Filed: Jun. 10, 2021

(65) Prior Publication Data

US 2022/0396937 A1 Dec. 15, 2022

(51) Int. Cl.

| | |
|---|---|
| ***E03C 1/046*** | (2006.01) |
| ***B05B 1/18*** | (2006.01) |
| ***B05B 7/24*** | (2006.01) |

(52) U.S. Cl.

CPC ................ *E03C 1/046* (2013.01); *B05B 1/18* (2013.01); *B05B 7/2443* (2013.01); *B05B 7/2462* (2013.01); *E03C 2201/40* (2013.01)

(58) Field of Classification Search

CPC .... E03C 1/046; E03C 1/0465; E03C 2201/40; B05B 1/18; B05B 7/2443; B05B 7/2462; B05B 1/185; B05B 7/2448; B05B 7/24; A47K 5/12; A47K 5/1202

USPC ........................................................ 239/310

See application file for complete search history.

(56) References Cited

U.S. PATENT DOCUMENTS

| | | | |
|---|---|---|---|
| 1,945,701 A | 2/1934 | Pearl | |
| 10,900,207 B1 | 1/2021 | Slaughter | |
| 2002/0070293 A1 | 6/2002 | Ti | |
| 2004/0206772 A1 * | 10/2004 | Leifheit | B05B 3/02 222/83 |
| 2019/0336987 A1 * | 11/2019 | Wang | B05B 1/185 |

* cited by examiner

*Primary Examiner* — Qingzhang Zhou
*Assistant Examiner* — Juan C Barrera
(74) *Attorney, Agent, or Firm* — Lewellyn Law, PLLC; Stephen Lewellyn

(57) ABSTRACT

A therapeutic substance dispensing shower head system has a shower head and a therapeutic substance carrying cartridge that is removably inserted into the shower head to diffuse the therapeutic substance into the water flowing through the shower head. The cartridge is configured for single hand manipulation and is inserted into a cartridge socket that is provided in the face of the shower head to make operation simple. The diffusion rate of the substance into the water flow is variably controlled by turning the cartridge while it is inserted in the cartridge socket. The diffusion is not predicated on aspiration or venturi concepts and thus is not sensitive to different water pressures and flow rates.

7 Claims, 8 Drawing Sheets

THERAPEUTIC SUBSTANCE DISPENSING SHOWER HEAD SYSTEM

FIELD OF THE INVENTION

The present disclosure relates to shower heads and, more particularly, to a therapeutic substance dispensing shower head system.

BACKGROUND OF THE INVENTION

Shower heads are well known and are used to dispense water in a steady stream onto a person for showering. Typical shower heads, however, do not provide a way to dispense substances into the water flowing through the shower head. Some shower heads have been developed to aspirate and mix liquid or dissolved particulate substances into the water flow for dispensing onto the person while showering.

These existing shower heads have not found wide acceptance because they are sensitive to water flow rate and pressure. A slight change in the flow rate or pressure affects the aspiration and mixture of the substance into the flow of water. This is problematic because the shower head may function as desired when connected to one water system, and then not function as desired when connected to another water system.

Accordingly, a need remains for a therapeutic substance dispensing shower head that overcomes the above-noted and other drawback found in existing substance dispensing shower head constructions.

SUMMARY OF THE INVENTION

Embodiments of the invention provide a therapeutic substance dispensing shower head system that overcomes the drawbacks of existing shower heads. The system includes a shower head and a substance containing cartridge that is removably received by the shower head for diffusing the contents of the cartridge into water flowing through the shower head.

It is an object of embodiments of the present invention to provide a therapeutic substance dispensing shower head system that uses a cartridge that is easily installed and operated by a single hand.

It is a further object of embodiments of the present invention to provide a therapeutic substance dispensing shower head system where the diffusion rate of a therapeutic substance into the flow of water is selectively controlled.

It is a further object of embodiments of the present invention to provide a therapeutic substance dispensing shower head system where the therapeutic substance can be a liquid, a dissolvable solid, a dissolvable particulate or combinations thereof.

It is a further object of embodiments of the present invention to provide a therapeutic substance dispensing shower head system where the therapeutic substance may be many different types of substances as desired, such as, for example fragrant oils, essential oils, moisturizers, soaps, or topical medications.

Numerous other objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature or a feature with similar functionality. In the drawings.

DETAILED DESCRIPTION OF THE INVENTION

Figure 1:
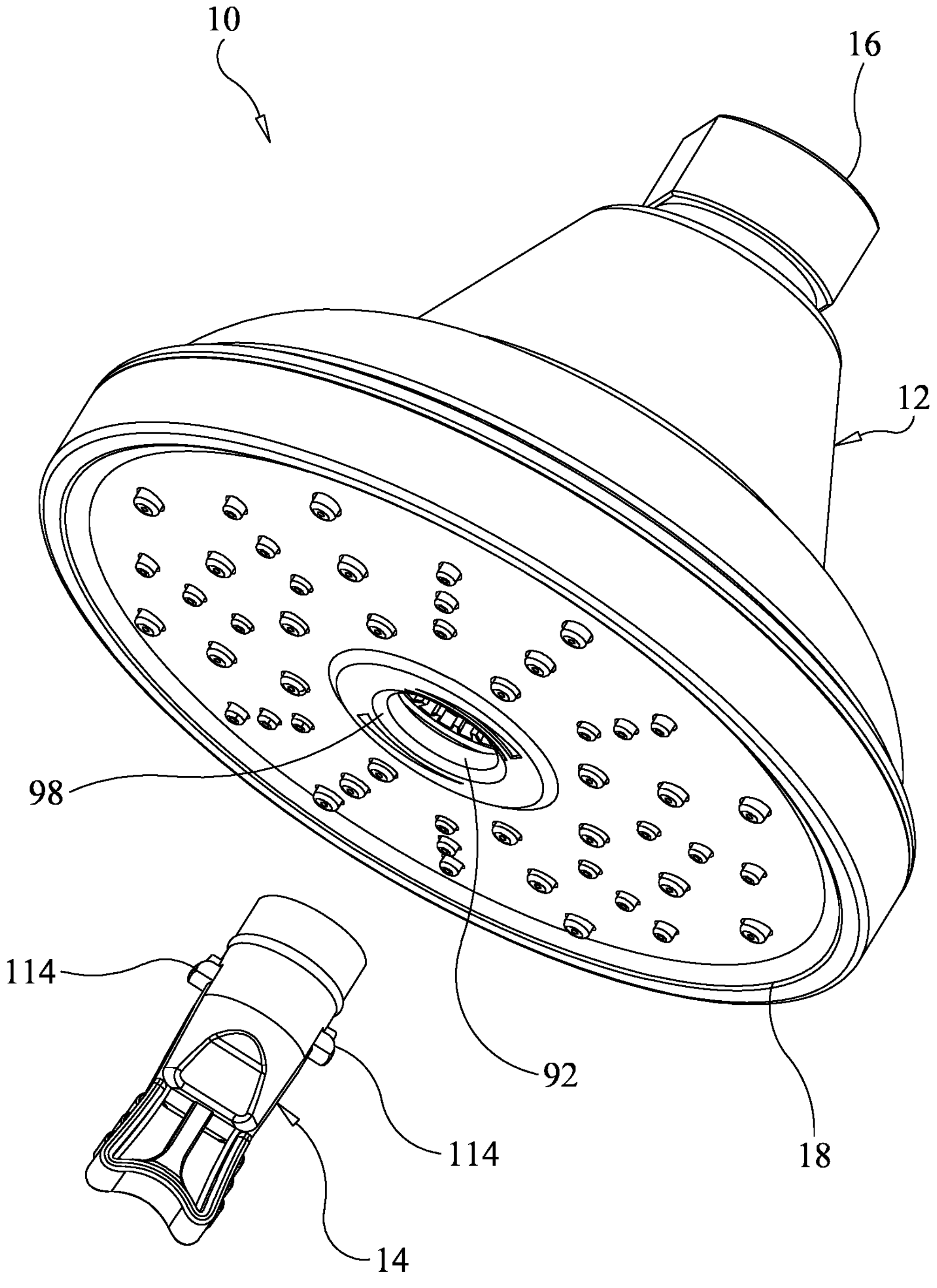
FIG. 1 is a perspective view of a therapeutic substance dispensing shower head system constructed in accordance with the principals of an embodiment of the present invention.
Figure 2:
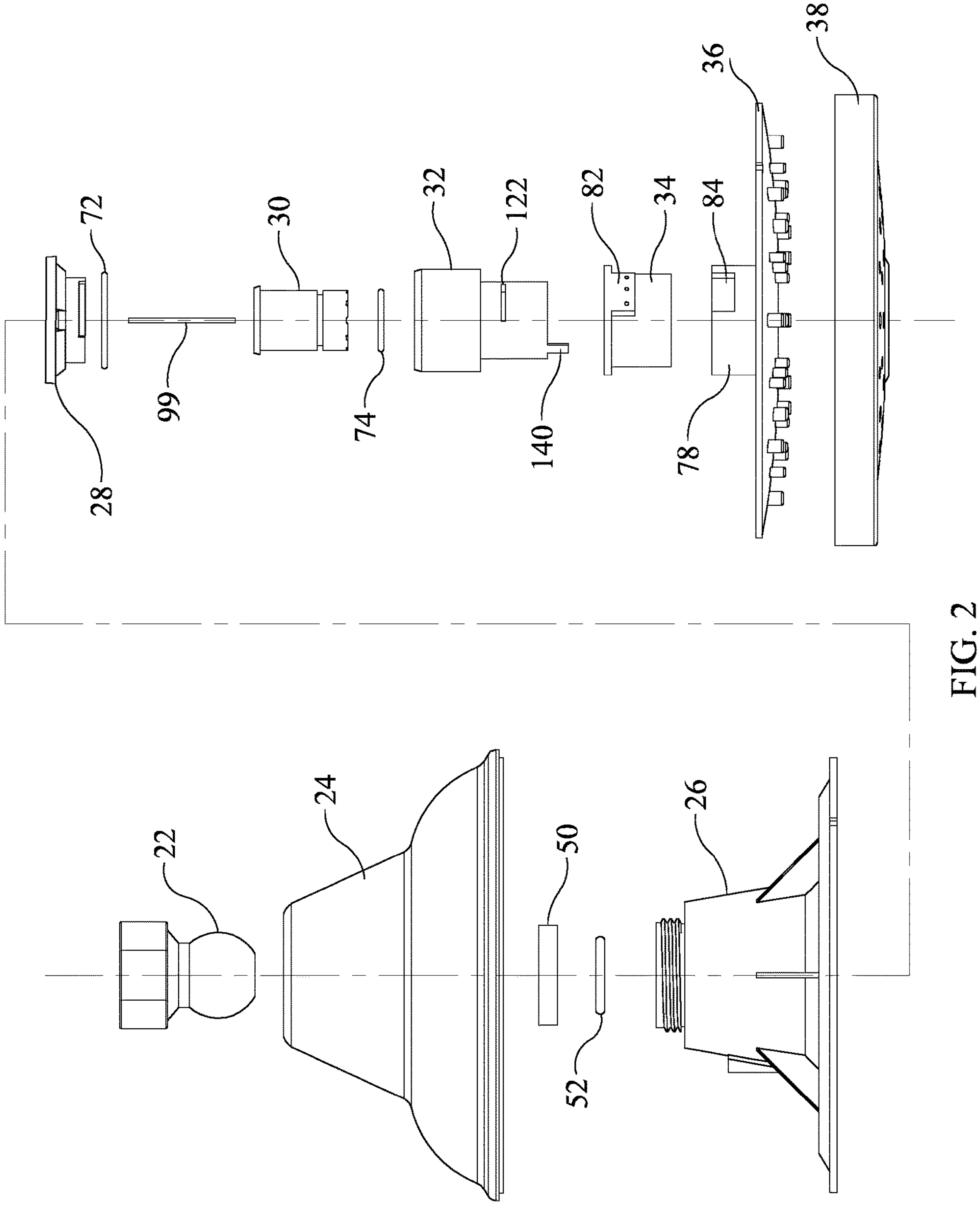
FIG. 2 is an exploded view of a therapeutic substance dispensing shower head system constructed in accordance with the principals of an embodiment of the present invention.
Figure 3A:
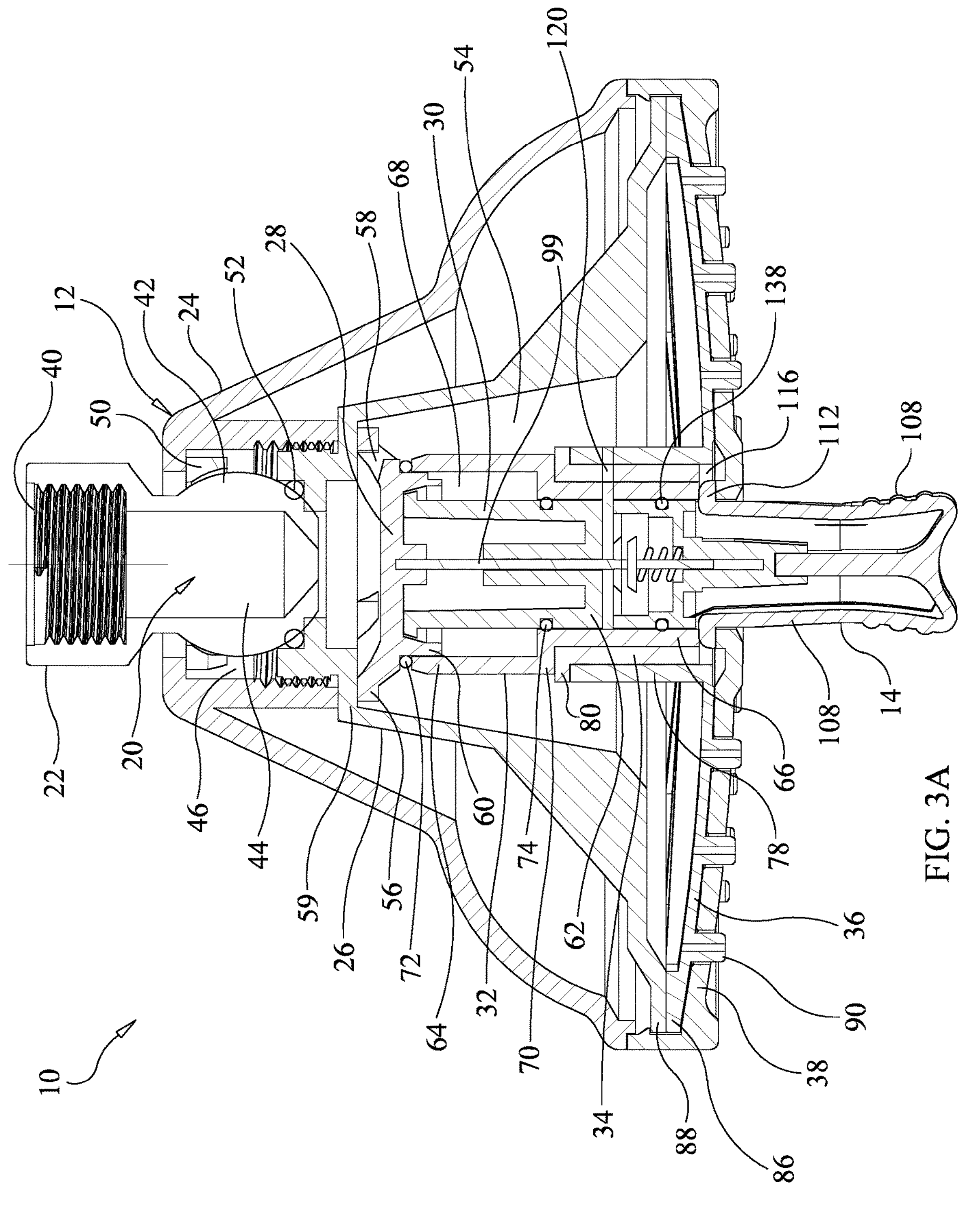
FIG. 3*a* is a cross-sectional view through a therapeutic substance dispensing shower head system constructed in accordance with the principals of an embodiment of the present invention.
Figure 3B:
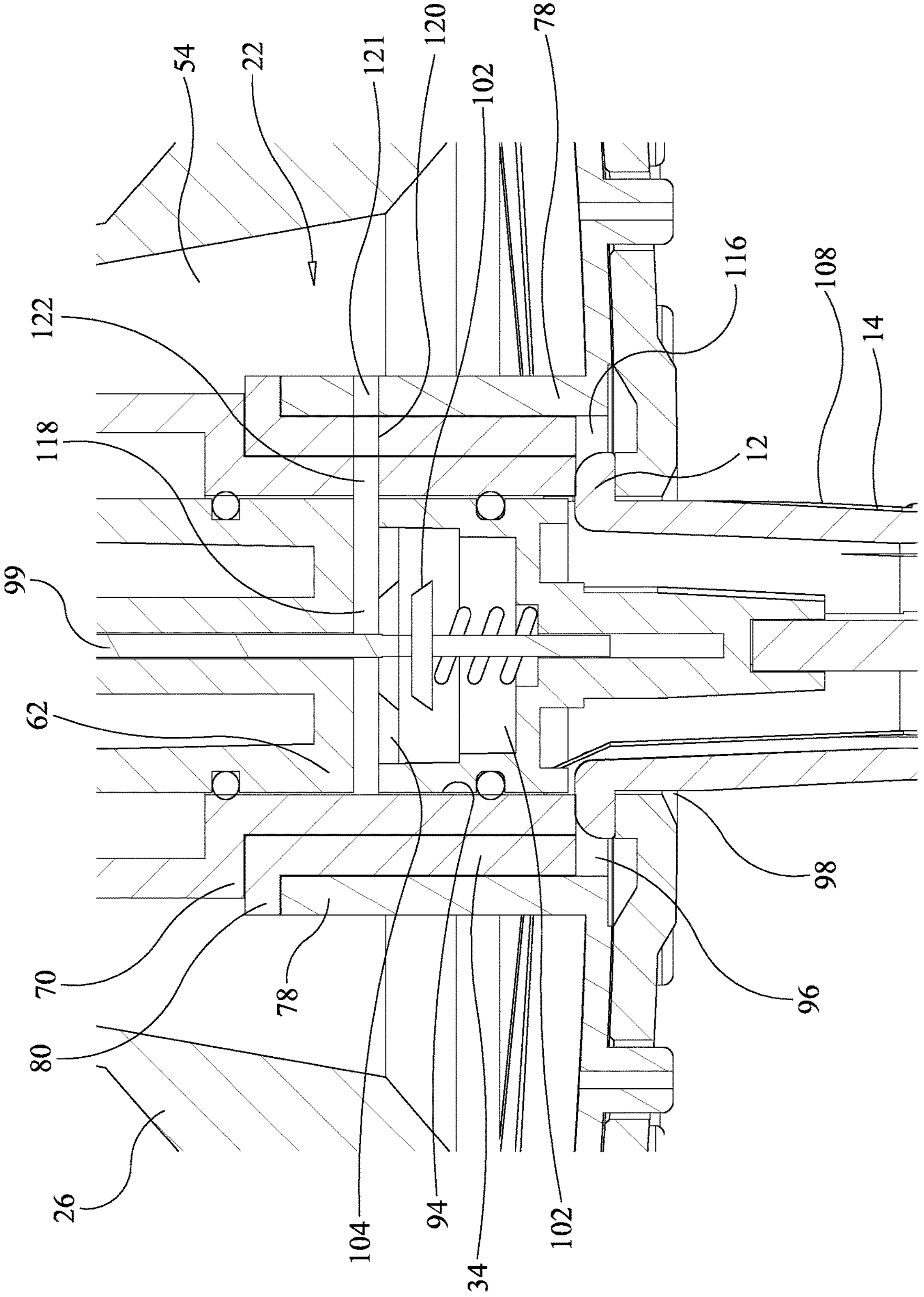
FIG. 3*b* is an enlarged view of the cross-sectional view of FIG. 3.
Figure 4:
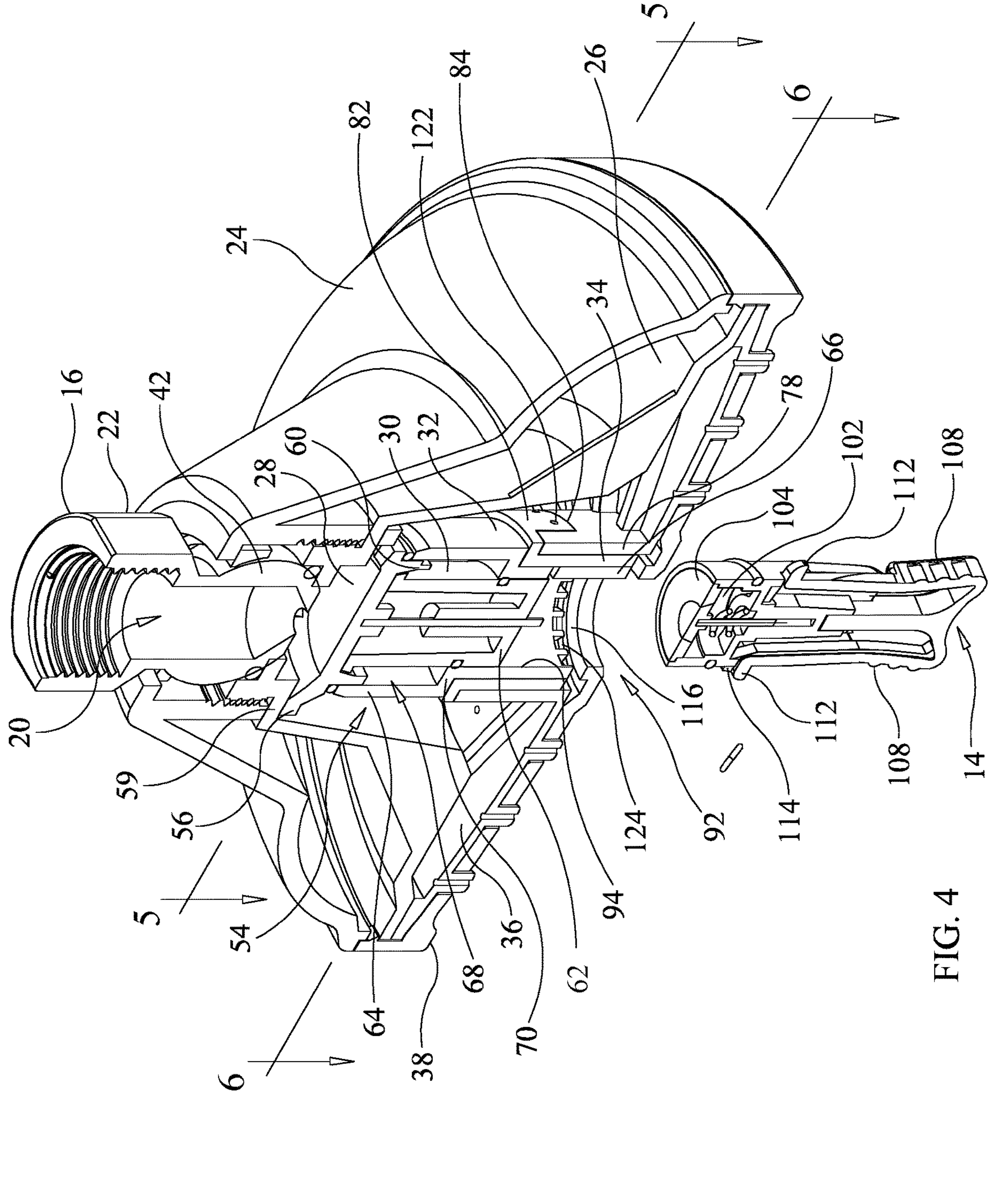
FIG. 4 is a cross-sectional perspective view of a therapeutic substance dispensing shower head system constructed in accordance with the principals of an embodiment of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided to a fundamental understanding of the invention to those skilled in the art.

With reference to the drawings in which like reference characters designate like or corresponding parts throughout the various views, a therapeutic substance dispensing shower head system that is constructed in accordance with an embodiment of the present invention is indicated generally at 10. It should be understood the therapeutic substance can be a liquid, a dissolvable solid, a dissolvable particulate or combinations thereof. Further the therapeutic substance may be many different types of substances as desired. As a non-limiting example, the therapeutic substance could be fragrant oils, essential oils, moisturizers, soaps, or topical medications.

Referring initially to FIGS. 1-4, the system includes a shower head 12 and a therapeutic substance containing cartridge 14 that is removably inserted into the shower head for diffusing the substance into water flowing through the shower head.

The shower head 12 has opposite distal and proximal ends 16 and 18. A primary flow passageway 20 extends between the distal end 16 and the proximal end 18 for receiving water through the distal end and directing the water outwardly from the distal end. As shown, in the representative embodiment, the flow passageway 20 extends through several components of the shower head 12 that are assembled and collectively provide the passageway.

Particularly, the shower head 12 has stem 22, an exterior housing 24, and interior housing 26, an impingement plate 28, a hub 30, a sleeve 32, a bushing 34, a dispersion plate 36, and an end cap 38 that are assembled to provide the shower head as will be discussed further herein.

The stem 22 has a threaded end 40 for being removably connected to a water supply source, an opposite end in the form of a ball-portion 42 of a ball-in-socket joint, and a bore 44 providing a section of the flow passageway 20. The ball portion 42 is disposed in ball socket 46 of the exterior housing 24 and is captively held therein by the interior housing 26 being threadedly connected at one end to the exterior housing by threaded coupling 48 in the ball socket. Washer 50 and O-ring 52 provide sealing contact between the ball portion 42, the exterior housing 24, and the interior housing 26.

The interior housing 26 has a bore 54 in which is held, in order in a direction from the distal end toward the proximal end, the impingement plate 28, the hub 30, the sleeve 32, and the bushing 34.

Figure 5:
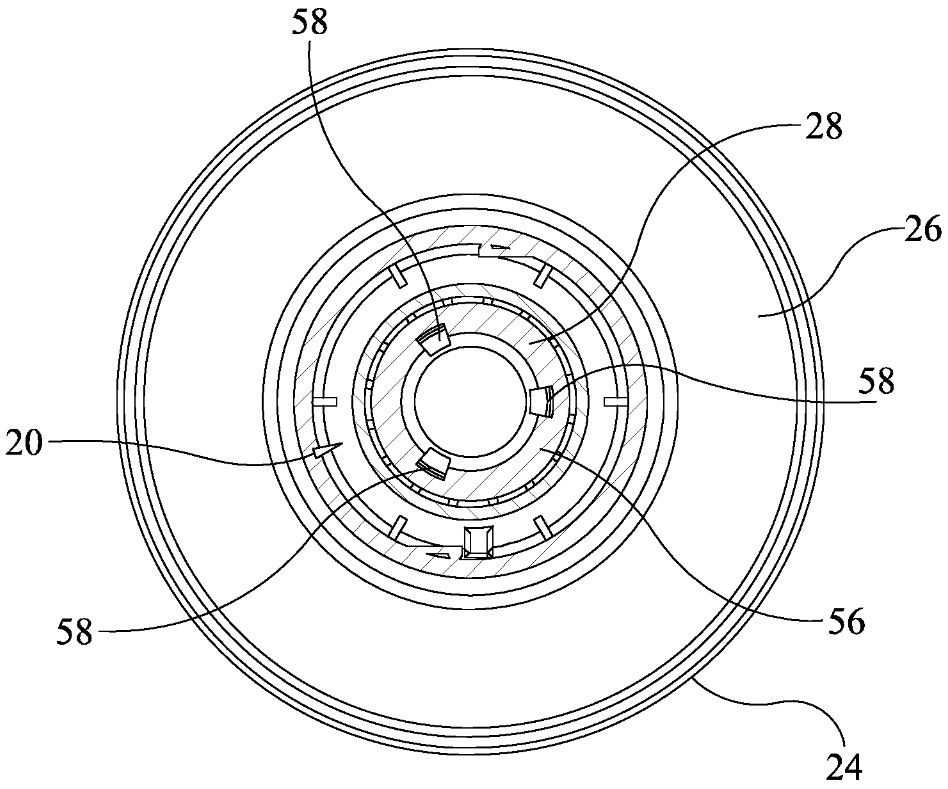
FIG. 5 is a cross-sectional view taken along line 5-5 in FIG. 4.

The impingement plate 28 has an upwardly turned peripheral rim 56 that abuts against shoulder 59 of the interior housing 26 in sealing contact therewith. With additional reference to FIG. 5, a plurality, representatively shown, three openings 58 are provided through the rim 56 at circumferentially spaced locations therearound. The openings 58 fluidically connect bore 54 and bore 44 and continue the flow passageway 20 across the impingement plate 28. The opposite side of the impingement plate 28 has a collar 60. The hub 30 has opposite ends and is attached at one end to the impingement plate 28 on the interior side of the collar 30, by a snap-fit engagement, for example. The opposite end of the hub 30 has an end wall 62 that is spaced from the impingement plate 28.

The sleeve 32 has opposite open ends 64 and 66 and a bore 68 extending therebetween. End 64 is circumferentially enlarged relative to end 66 which provides a sleeve shoulder 70. The sleeve 32 is disposed with end 64 located distally and end 66 located proximally. The impingement plate collar 60 extends into bore 68 through sleeve end 64 with sleeve 64 rotatably disposed relative to the collar such that the sleeve 64 can rotate axially about the collar. Additionally, a length of the hub 32 is disposed in bore 68 such that the hub end wall 62 is located proximally of the sleeve shoulder 70. O-ring 72 provides a sealing contact between end 64 of the sleeve and the impingement plate 28. O-ring 74 provides a sealing contact between the surface of sleeve bore 68 and an exterior surface of the hub 32.

The opposite end 66 of the sleeve is disposed in bore 76 of the bushing 34 for axial rotation relative to the bushing. The bushing 34 is formed of an elastomeric or rubber material to provide a sealing contact between the surface of the bore and the exterior surface of the sleeve. The bushing 34 is pressed into upstanding collar 78 on the dispersion plate 36 and includes a flanged, peripheral lip 80 that is sandwiched between the end of collar 78 and the sleeve shoulder 70. The bushing 34 also includes a boss 82 on its exterior surface that is received by a notch 84 through the sidewall of collar 78. The boss 82, disposed in the notch 84, retains the bushing stationary position when the sleeve 32 is axially rotated.

The dispersion plate 36 is attached or fixed to the interior housing 26 at cooperative peripheral flanges 86 and 88, respectively. The dispersion plate 36 includes a plurality of openings or nozzles 90 through which water flowing in the passageway 20 exits the shower head 12. The end cap 38 is attached to the exterior housing 24 with the nozzles 90 extending through corresponding holes formed in the end cap.

The shower head 12 further includes a cartridge socket 92 for removably receiving therein the cartridge 14. The cartridge socket 92 is defined by the sidewall 94 of the sleeve bore 68, end wall 62 of the hub, opening 96 through the dispersion plate which cooperatively aligns with the sleeve bore, and opening 98 through the end cap which cooperatively aligns with opening 96. The sidewall 94 provides a cartridge socket sidewall and the end wall 62 provides a cartridge socket end wall. Openings 96 and 98 provide a socket opening into the socket.

A pin 99 is fixedly attached to the impingement plate 28 and extends through a corresponding bore in the hub 32 and through the end wall 62 and terminates at a spaced distance from the end wall and within the cartridge socket 92.

The cartridge 14 has a cartridge body 100 that defines a receptacle or an interior space 102 for holding a quantity of substance to be dispensed from the cartridge through dispensing end 104. The cartridge 14 further includes a grasp 106 that is configured to be grasped by a user in inserting, removing, and operating the cartridge. The grasp 106 includes a pair clips 108 that are attached at one end, the proximal end, of the grasp and extend upwardly along opposite sides of the cartridge body 100 where they each terminate at a free end 110. The clips 108 are made of a resilient material allowing them to bend inwardly in a radial direction when squeezed. Each free end includes an outwardly extending flange or dog ear 112 that project in a transverse direction relative to the cartridge body. Each free end also includes a tab 114 that extend from the free end in axial direction.

The cartridge 14 is inserted, dispensing end 104 first, into the cartridge socket 92 through the socket opening 116 and when fully seated, the dog ears 114 are disposed in a circumferential grove 116 and engage with the rim around opening 98, thereby preventing withdrawal of the cartridge from the cartridge socket. Squeezing the clips 108 allow the cartridge 14 to be withdrawn from the cartridge socket.

The cartridge 14 is configured such when the cartridge is fully seated into the socket 92, the dispensing end 104 is spaced from socket end wall 62 to provide a diffusion gap 118 between the dispensing end and the socket end wall. The pin 99 also extends through the dispensing end 104 and opens the interior space 102 to the diffusion gap. And the cartridge 14 engages with the sleeve 32 for conjoined axial rotation such that turning the cartridge causes the sleeve to rotate.

Figure 6:
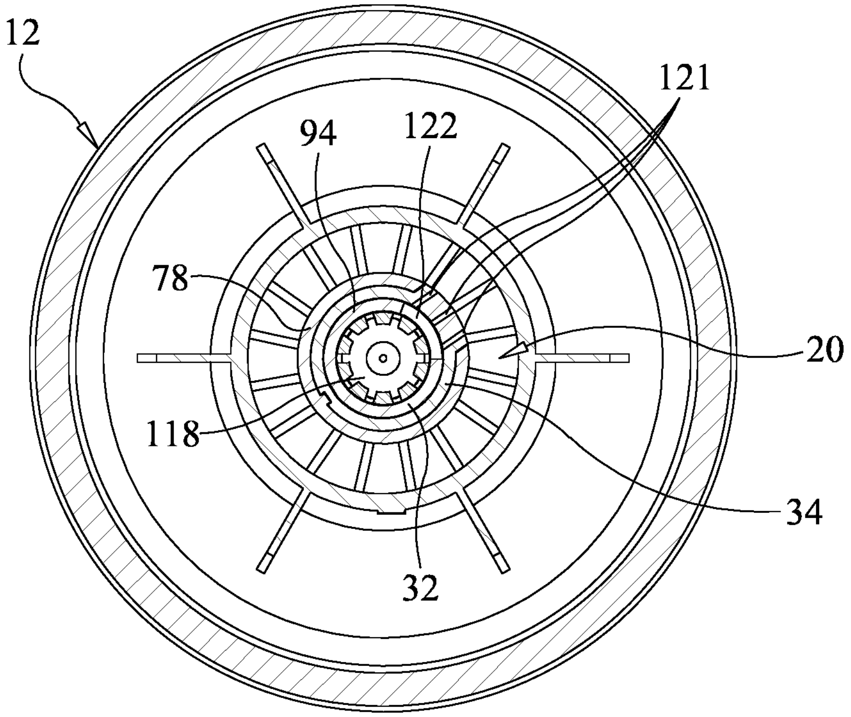
FIG. 6 is a cross-sectional view taken along line 6-6 in FIG. 4.
Figure 7:
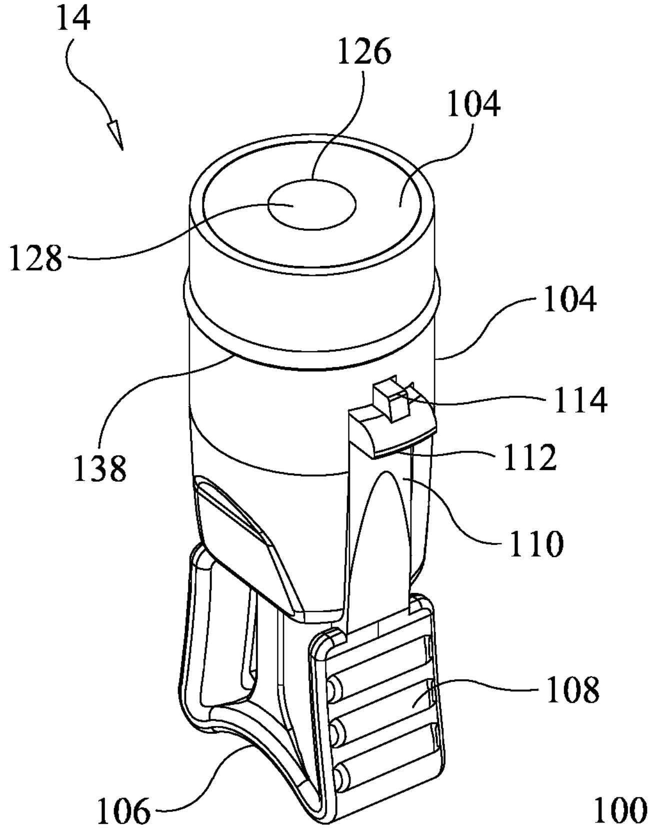
FIG. 7 is a perspective view of a cartridge of a therapeutic substance dispensing shower head system constructed in accordance with the principals of an embodiment of the present invention.
Figure 8:
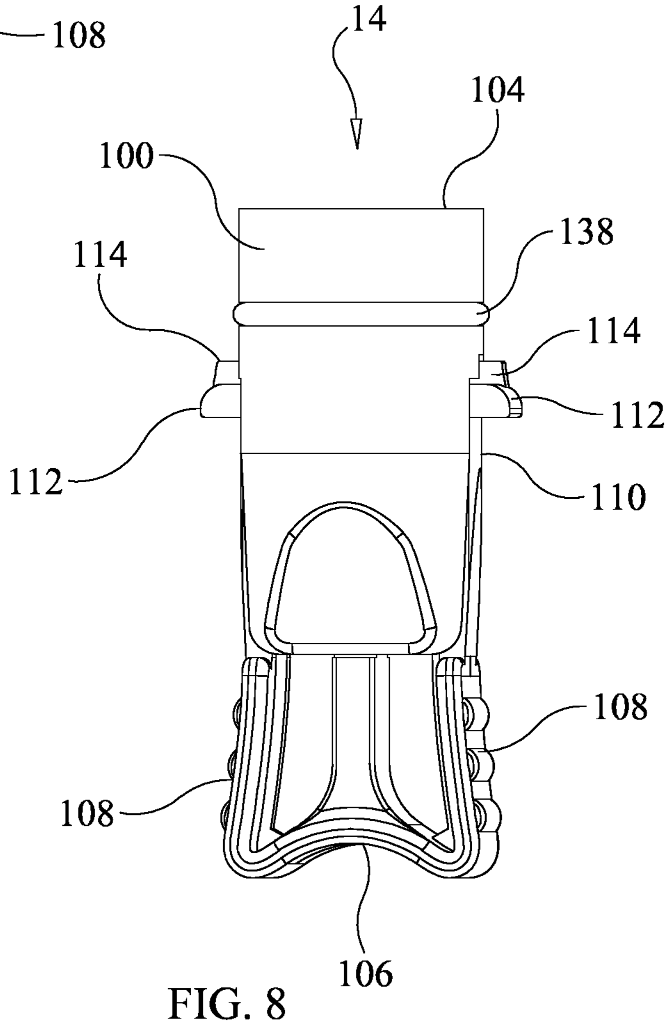
FIG. 8 is a first side view of the cartridge of FIG. 7.

With additional reference to FIG. 6, a diffusion passageway 120 is provided through the socket sidewall 94 and fluidically connects the diffusion gap 118 and the primary flow passageway 22 at location within bore 54 of the interior housing. In the representatively illustrated embodiment, the diffusion passageway 120 is provided by a slot 122 through the sidewall 94 and one or more apertures 121 through the side of bushing 34.

In aspects, the cross-sectional opening or area of the diffusion passageway 120 that is open between the diffusion gap 118 and the primary flow passageway 22 can be selectively adjusted by rotating the sleeve 32 which in turn rotates the socket sidewall 94 and moves the slot 112 relative to the one or more apertures 122. Rotating the sleeve in a first direction aligns the slot with 112 with a greater number of apertures 122 or a cross-sectional opening through the bushing. And rotating the sleeve in an opposite, second direction achieves the opposite affect and misaligns the slot 112 with the apertures 122.

Varying the cross-sectional opening or area of the diffusion passageway 120 affects a diffusion rate of a therapeutic substance held by the cartridge into the water flowing through the primary flow passageway 20. It should be noted that the configuration of the slot 112, and apertures can be varied to meet the dispersion needs based on characteristics, such as, for example the viscosity of a therapeutic substance intended to be diffused into the diffusion passageway 120.

In aspects, an indicator can be provided so show how open the diffusion passageway 120 is. The indicator can include a tab or projection 140, the end of which can be seen through indicator opening 142 formed through the dispersion plate 36.

In aspects, the cartridge 14 is releasably engaged with the sleeve 32 for conjoined rotation therewith by the one or more tabs 114 on the cartridge 14 being removably received by one or more corresponding notches 124 formed around the periphery of bore 68 at end 66.

With additional reference to FIGS. 7-10, in an embodiment, the cartridge 14 has a dispensing opening 126 through the dispensing end 104 and a closure 128. The closure 128 is mounted a stem 130 that is disposed in bore 132 for reciprocation relative to the dispensing opening between a closed position where the closure 128 seals the dispensing opening 126, and an open position wherein the closure does not seal the dispensing opening. The closure 128 is biased into the closed position by spring 134. When the cartridge 14 is seated in the cartridge socket 92, the pin 99 urges against the closure 128 and pushes it into the cartridge, thereby opening the dispensing opening 126 to the diffusion gap. O-ring 138 provides sealing contact with the cartridge socket 92. It is contemplated that this form of cartridge can be refilled and used repeatedly.

Figure 11:
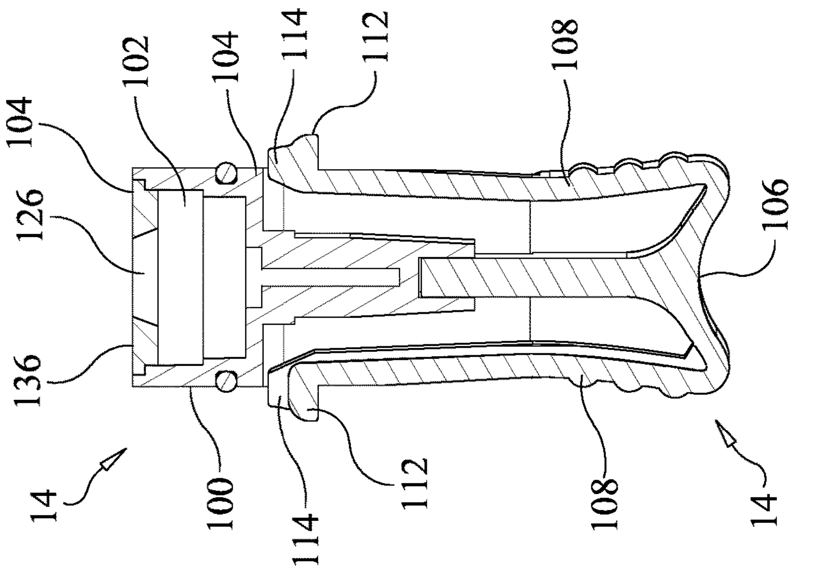
FIG. 11 is a cross-sectional view of a cartridge according to an alternative embodiment.
Figure 10:
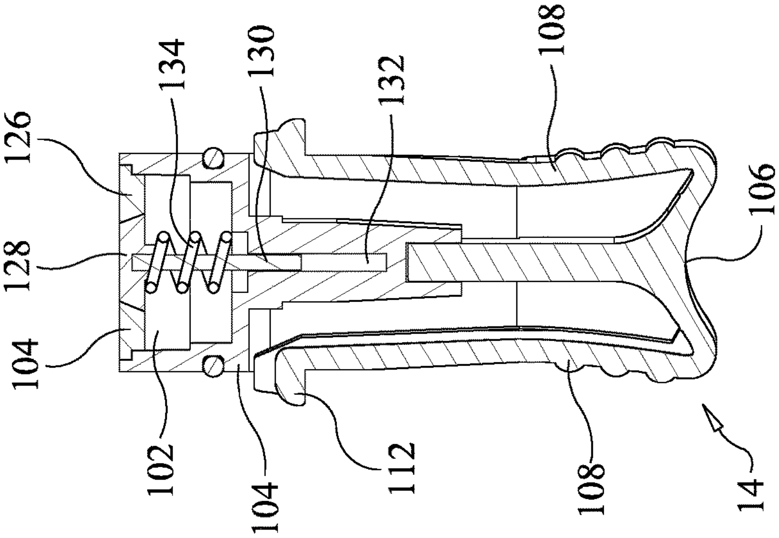
FIG. 10 is a cross-sectional view taken along line 10-10 in FIG. 9.
Figure 9:
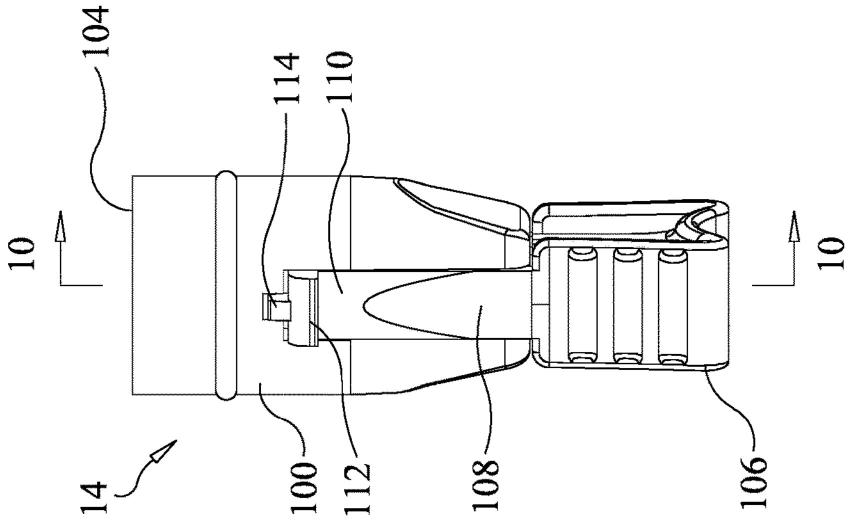
FIG. 9 is a first side view of the cartridge of FIG. 7.

In FIG. 11 an alternative embodiment of the cartridge 14 is shown. Here the cartridge 14 has a dispensing opening 126 through the dispensing end 104 and a frangible or pierceable seal 136 closing the dispensing opening. When the cartridge 14 is fully seated in the cartridge socket 92, the pin ruptures, pierces, or otherwise breaks open the seal 136, thereby opening the dispensing opening 126 to the diffusion gap. In this configuration, the pin 99 can be provided so that is perforates the seal 136 in a manner such that the pin does not seal the perforation as it remains extending through the dispensing opening 126. As a non-limiting example, the free end of the pin could be enlarged relative to the pin shaft to create a perforation in the seal that is larger than the pin shaft. Other configurations are also possible to achieve the same desired result.

While the invention has been particularly shown and described with respect to the illustrated embodiments thereof, it will be understood by those skilled in the art that the foregoing and other changes in form and details may be made therein without departing from the spirit and scope of the invention.

What is claimed is:

1. A shower head system for dispensing a therapeutic substance, the shower head system comprising:

a shower head with proximal and distal ends and a primary fluid passageway extending between the proximal and distal ends for conducting a flow of water from the distal end and outward from the proximal end;

a cartridge socket, the cartridge socket having a socket opening through the proximal end, a socket end wall spaced from the socket opening in a direction toward the distal end, and a socket sidewall extending between the socket opening and the socket end wall;

a cartridge removably inserted into the cartridge socket and releasably retained therein, the cartridge having a dispensing end that is spaced from the socket end wall when fully inserted into the cartridge socket thereby providing a diffusion gap between the dispensing end and the socket end wall, the cartridge having a substance containing space;

a pin extending into the cartridge socket from the socket end wall, the pin extending through the cartridge dispensing end when the cartridge is fully inserted into the cartridge socket, thereby opening the substance containing space to the diffusion gap; and a diffusion passageway extending through the socket sidewall at a position on the socket sidewall that is located along the diffusion gap and the diffusion passageway fluidically connecting the diffusion gap and the primary fluid passageway;

an impingement plate, having an impingement plate collar;

a hub, the hub attached to the impingement plate and having a hub end wall that at least partially provides for the socket end wall;

a sleeve having a first sleeve end, a second sleeve end, a sleeve bore extending between the first and second sleeve ends;

the impingement plate collar being received in the sleeve bore and the sleeve being rotatable about a rotation axis extending between the proximal and distal ends and relative to the impingement plate collar;

the hub being received in the sleeve bore;

an interior surface of the sleeve bore at least partially providing the socket sidewall; and wherein rotating the sidewall by rotation of the sleeve, in a first direction about the rotation axis selectively closes the diffusion passageway and rotating the sidewall by rotation of the sleeve in a second direction about the rotation axis selectively opens the diffusion passageway.

2. The shower head of claim 1, wherein the cartridge releasably engages with the socket sidewall when fully inserted into the cartridge socket for conjoined rotation with the socket sidewall, and wherein the cartridge can be turned about the rotation axis in the first or second directions thereby rotating the sidewall in the same direction.

3. The shower head of claim 2, wherein the cartridge includes one or more tabs, and the socket sidewall includes one or more notches around its periphery, and wherein the cartridge is releasably engaged with the socket sidewall by at least one of the one or more tabs received by a corresponding notch.

4. The shower head of claim 1, wherein the cartridge has one or more clips that releasably engage a groove that encircles the socket opening, thereby releasably retaining the cartridge in the cartridge socket.

5. The shower head of claim 1, wherein the cartridge further comprises:

a dispensing opening through the dispensing end;

a closure mounted to the cartridge for reciprocation relative to the dispensing opening between a closed position where the closure seals the dispensing opening, and an open position wherein the closure does not seal the dispensing opening; and wherein the closure is biased into the closed position.

6. The shower head of claim 5, wherein the cartridge further comprises:

a spring disposed in the substance containing space and acting to bias the closure into the closed position.

7. The shower head of claim 1, wherein the cartridge further comprises:

a dispensing opening through the dispensing end; and a frangible or pierceable seal attached to the dispensing end and sealing the dispensing opening until broken or pierced by the pin extending through the dispensing end.

* * * * *